April 11, 1939.  P. O. KOEHLER  2,154,169
MOLDING DEVICE
Filed Oct. 7, 1935  2 Sheets-Sheet 2

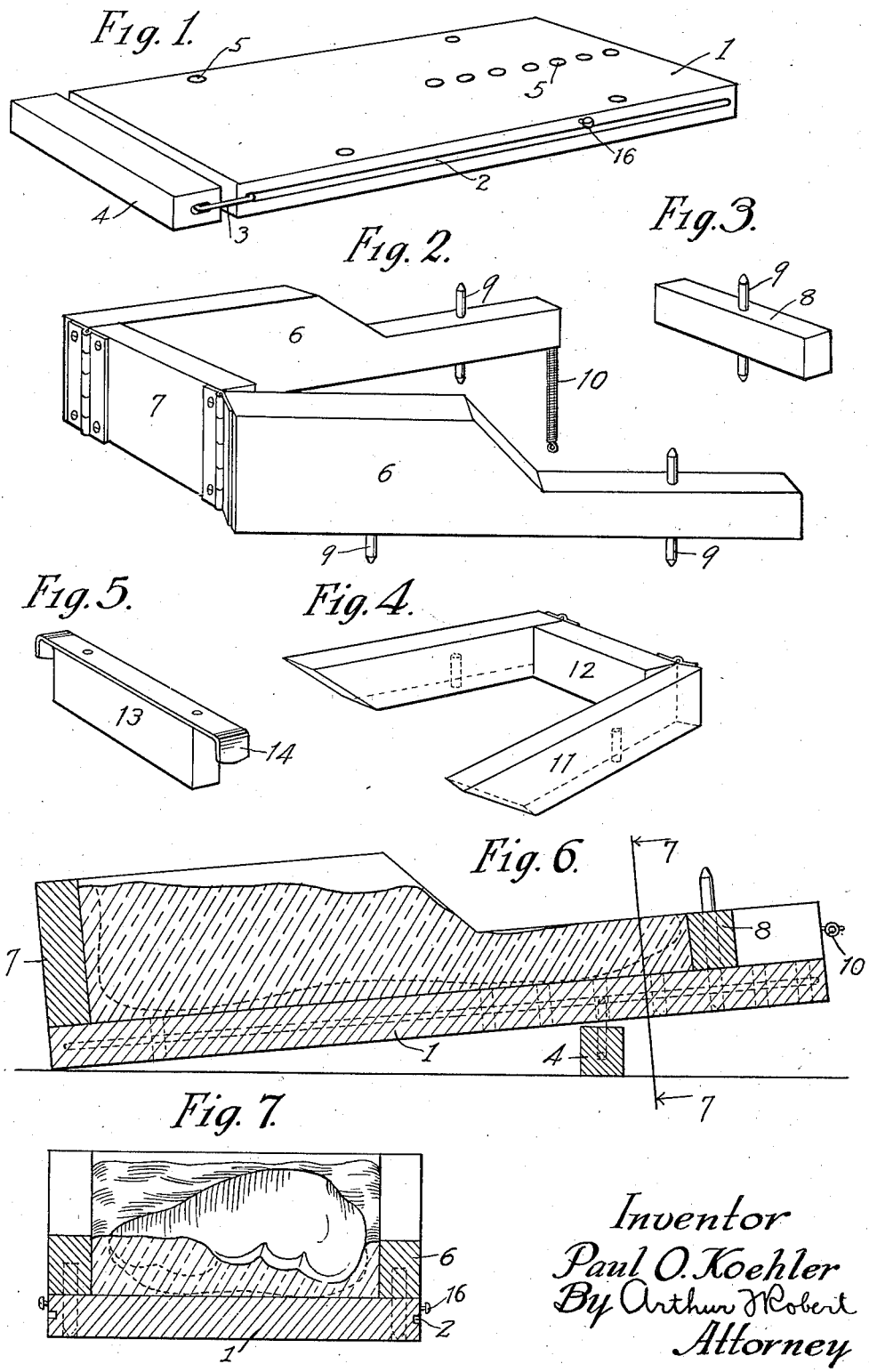

Inventor
Paul O. Koehler
By Arthur J. Robert
Attorney

Patented Apr. 11, 1939

2,154,169

UNITED STATES PATENT OFFICE 2,154,169

MOLDING DEVICE

Paul O. Koehler, Louisville, Ky.

Application October 7, 1935, Serial No. 43,832

2 Claims. (Cl. 18—32)

In manufacturing corrective appliances and special foot wear to support "fallen" arches or alleviate the discomfort occasioned by other foot ailments, it is desirable to have a replica of the foot from which accurate measurements can be taken. In making such replica the foot to be reproduced is used as a pattern around which a mold is formed. When the foot is removed from the mold a replica or positive thereof is formed simply by pouring a plastic casting material, such as plaster, into the casting space or negative of the mold.

One method largely used today for making such mold consists in covering strips of gauge with plaster, preferably of a creamy consistency and manually fitting or molding such strips to the foot so as to form a tightly fitting "slipper" which can be removed from the foot when the plaster has hardened. So far as is known all other methods employed to any appreciable extent involve the manual application of plaster directly to the foot to the same or greater degree. The manual application of plaster is objectionable because it requires the use of a skilled operator and involves repeated contact with the operator's hands with the plaster which produces a deleterious drying effect on the skin. It also involves considerable dripping of the plaster which necessitates either a floor cleaning operation or the use of papers or other special drip catching means. To avoid these objections it has been proposed to provide casting boxes or flasks within which the entire mold forming operation can be performed. Up to the present time, however, no practical form of flask has been devised; consequently they are not used to any appreciable extent.

The present invention, which is directed to a means and a method of producing a mold that avoids all of the foregoing objections, has for its principal object the provision of a simple and highly practical form of molding flask which can be used easily and quickly to produce an accurate mold without involving contact of the hands, dripping of the plaster or the use of a skilled operator.

Another object is to provide a flask, the molding space of which can be readily varied in length to conform to the length of the foot thereby enabling the amount of molding material required in any particular mold forming operation to be reduced to a minimum.

Another object is to provide a means by which the flask may be tilted so as to produce a greater thickness of mold material at one end or the other as desired.

Another object is to provide an easy and simple method for making the mold.

The invention is illustrated in the accompanying drawings wherein:

Figure 1 is a perspective of the base of a molding flask constructed in accordance with my invention;

Figures 2 and 3 are perspectives of the wall members for the lower section of the flask;

Figures 4 and 5 are perspectives of the wall members for the upper section of the flask;

Figure 6 is a longitudinal vertical section through the lower part of the flask after the lower mold has been made;

Figure 7 is a transverse vertical section taken along line 7—7 of Figure 6.

Figure 8:
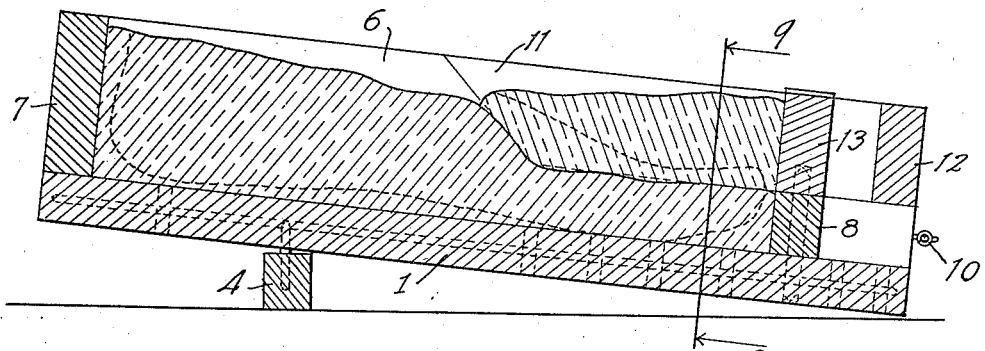
Figure 8 is a longitudinal vertical section through the complete flask with lower and upper mold in place.
Figure 9:
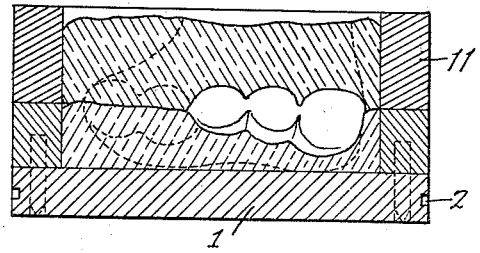
Figure 9 is a transverse vertical section taken along line 9—9 of Figure 8.
Figure 10:
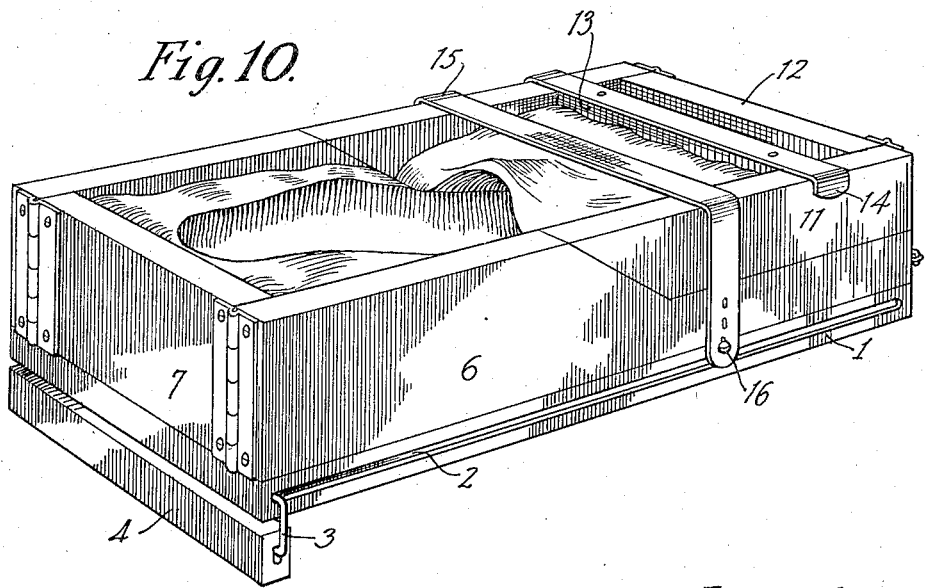
Figure 10 is a perspective of the flask with both molds in place.

In accordance with my invention a molding flask is provided having a lower section in which a mold may be formed for taking an impression of the lower part of the foot including the heel, arch and toes. This type of cast is the only one necessary in treating perhaps 70% of the foot ailments to be corrected. In the remaining 30% it is usually necessary to take a cast of the upper part of the toes and possibly the instep of the foot. The present invention, therefore, contemplates the use of an upper section which may be superposed over the front end of the lower section to provide the necessary casting space.

The lower section includes a base board of suitable width and of length slightly greater than that of the longest foot likely to be reproduced. The side faces of the base are grooved substantially throughout their length to provide trackways 2. These trackways slidably receive the inturned ends of links 3, the inturned opposite ends of which engage the corresponding ends of block 4. The block 4 may be moved to any desired position under the base or around either end thereof. The top or upper face of the base is formed with a series of openings 5 spaced along both its longitudinal center, adjacent the front or toe end thereof, and its side margins.

The lower section also includes wall members which comprise side members 6, heel members 7 and toe member 8. These members may be made integral with the base, but preferably they are arranged for separation therefrom and with the side and heel members hinged together, the toe member being entirely separate. The rear parts, that is the side and heel members, are positioned over the corresponding margins of the upper face of the base while the toe member is placed across the base and spaced from the heel member at a distance, depending upon the length of the particular foot to be cast. In locating this member the foot is placed within the box with its heel end slightly in advance of the heel member 7 and the toe member then placed slightly in advance of the toe end of the foot. The wall members of the lower section are provided with vertical studs 9 positioned and dimensioned to fit into both the openings 5 of the base and into suitable openings of the upper section, but any other suitable means for securing the cast may be utilized. Preferably the free or toe ends of the side members 6 are resiliently connected together by spring 10.

It will be noted that the heel portion of the lower section is made to extend from the base vertically higher than the toe portion thereof. The upper section of the flask is arranged to extend over the toe portion and is preferably dimensioned to render the height of the flask from heel to toe uniform. The upper section comprises side members 11 and toe member 12. These preferably are hinged together and provided with suitable openings to receive the studs 9 of the lower section. The upper section also includes a separate toe member 13 which when the foot to be reproduced is shorter than the longest for which the box is designed, is spaced correspondingly inward from the toe end and positioned directly over the similarly spaced toe member 8 of the lower section. In this way the molding space necessary for the mold may be reduced to a minimum, thus permitting a corresponding reduction in the amount of molding material required. The adjustable toe member 13 may be anchored more securely in place by providing it with wings 14 which engage over the side members 11.

In using the flask, a perforatable member, such as a sheet of paper, is placed over the base 1 in order to cover the openings 5, and particularly those which communicate with the mold space proper. The lower section is then placed in position by fitting its studs 9 into the openings of the base 1. If a foot of maximum size is to be cast the stud of toe member 8 will be placed in the outermost opening, adjacent the toe end of the base. For smaller feet, it is correspondingly positioned inwardly from that end in one of the other openings of the base. The flask may now be filled with liquid plaster to the depth desired, this depth normally being slightly smaller than the depth at the toe portion of the lower section. Usually it is desirable to shake the box somewhat to remove air bubbles from the plaster. Before the plaster has time to set it is placed on a level surface and the toe end tilted upwardly or elevated by positioning block 4 thereunder. The elevation of the box produces greater depth of plaster at the heel where it is possible to take a full impression without interfering with the removal of the foot from the mold after it has hardened. The tilting of the flask also reduces the depth of plaster at the toe end, which depth should be small enough to permit the removal of the foot without damaging the resultant mold. With the proper level and elevation the foot is carefully placed in the flask and held there until the plaster has set, whereupon the foot may be removed if a cast of the lower part of the foot only is desired. On the other hand, if the upper part of the toes and the instep likewise is to be cast, then, before the plaster of the lower mold hardens, its marginal edges, along the toe portion, are preferably troweled evenly with the upper marginal edges of the lower section so as to prevent contact between the upper mold and the inner side walls of the lower section.

When the plaster sets, its upper exposed surface and that of the foot is coated with talcum powder or some other suitable material to prevent adherence between the upper and lower mold. The upper section is now placed in position over the toe end of the lower section and, for the smaller mold, the adjustable toe member 13 is arranged over the inwardly spaced toe member 8 of the lower section. The block 4 may now be positioned under the heel portion of the flask so as to elevate it and thus maintain the plaster, which may be poured over the toes, within the limits of the upper section and thus directly over the toe and the instep. Upon the setting of this plaster the upper mold adheres to the upper section so that both upper section and mold may be removed as a unit. Whereupon the foot may be removed from the lower mold. Both upper and lower mold are then coated with the usual separating material and reassembled to form the foot cavity or negative which is then filled with plaster. Since better results can be obtained by shaking the flask, to remove air bubbles, I provide a flexible strap 15 which extends from a projection 16 of the base completely around the upper section to another similar projection on the other side of the base. This strap is stretched taut so as to hold the flask firmly as a single unit and thus enable its being shaken vigorously without subjecting the mold to damage. After shaking, the flask may be placed on a level support with the block 4 swung around one end of the base. When the plaster finally sets the flask may be easily and quickly disassembled and the positive cast removed.

It will be readily appreciated that the foregoing structure and method permits the reproduction of either or both lower and upper parts of the foot to be made easily, quickly and accurately, and without requiring the attention of a skilled operator. It also enables the taking of a full impression of the foot and reduces to a minimum the possibility of damage to the negative during the separation of the molds, the withdrawal of the foot, the reassembling of the mold, and such other handlings as may be necessary. Furthermore, it allows such a cast to be taken without necessitating contact of the operator's hands with the plaster or occasioning the drippage of the plaster. Finally, it may be noted, that the structure and method utilized results in the formation of a simple two part mold; hence the time required for casting either the lower part or both parts of the foot is reduced to a minimum.

Having described my invention I claim:

1. A foot molding device of the class described comprising: a flask, having a molding space; and a bar slidably connected to said flask for movement underneath the flask from one position, wherein it elevates one end thereof, to another position, wherein it elevates the opposite end thereof.

2. A foot molding device of the class described comprising: a base; a lower wall section detachably secured to and removable vertically from said base and cooperating with it to form an open-top heel and bottom-toe molding space; and an upper wall section detachably secured to and vertically removable from the toe end of the lower wall section, said upper wall section forming an open-top upper-toe molding space and having side and toe wall members with at least one side wall member hinged to the toe wall member to swing horizontally outward when removed from the lower wall section.

PAUL O. KOEHLER.